UNITED STATES PATENT OFFICE.

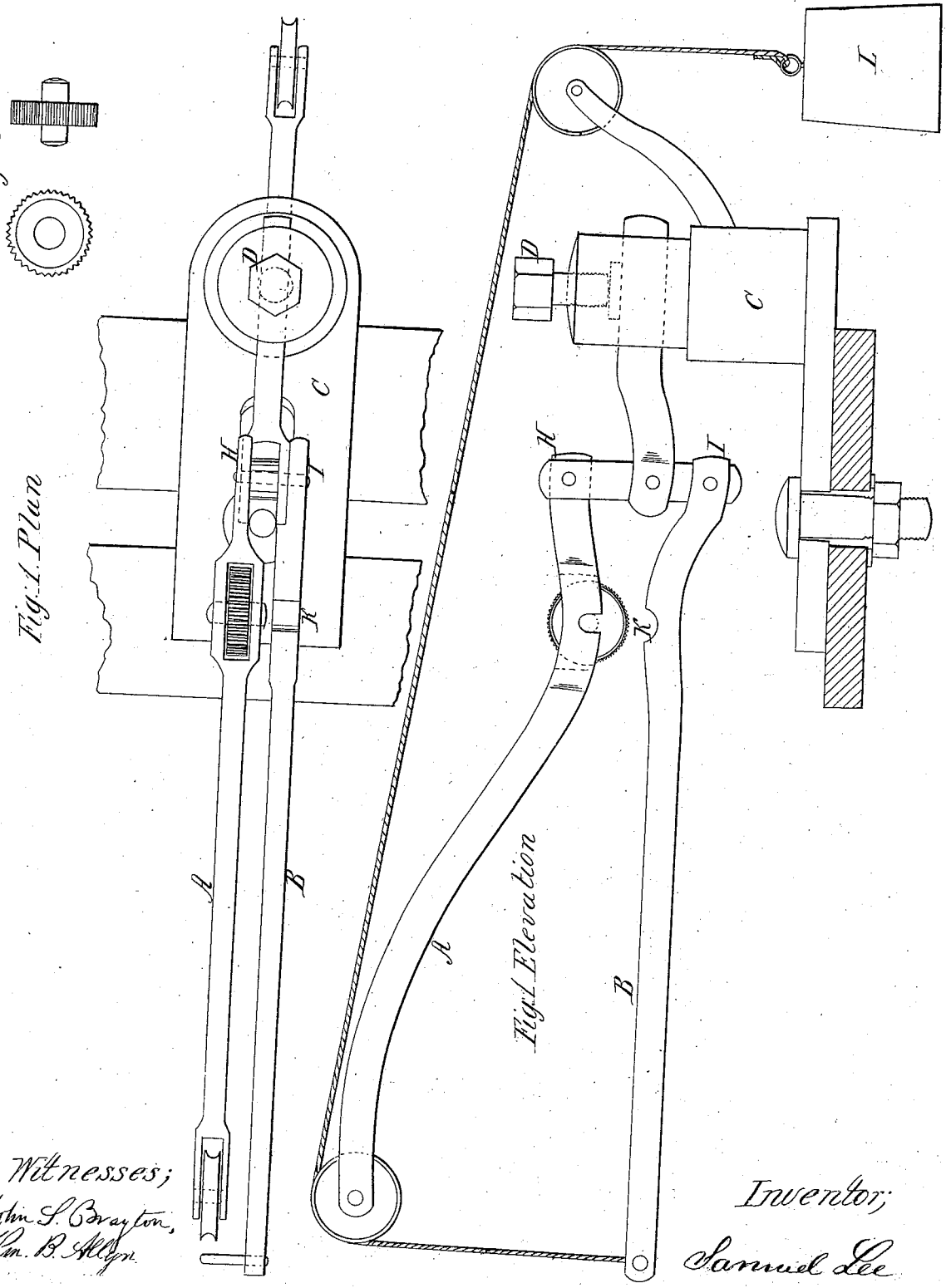

SAML. LEE, OF TAUNTON, MASSACHUSETTS, ASSIGNOR TO CHAS. S. POMEROY, OF NEW YORK, N. Y.

MAKING STEELS FOR SHARPENING KNIVES.

Specification of Letters Patent No. 23,982, dated May 10, 1859.

*To all whom it may concern:*

Be it known that I, SAML. LEE, of Taunton, in the county of Bristol and State of Massachusetts, have invented a new and Improved Method of Making Steels for the Sharpening of Knives and other Cutting Instruments; and I do hereby declare that the following is a full and exact description thereof, reference being had to the accompanying drawings, and to the letters of reference marked thereon.

The ordinary form of steels for sharpening knives previous to my invention was as follows: A piece of steel forged into the same general shape as that used by me, was covered with scratches upon its surface by means of a file, which method merely raised the grain of the metal by scratching away particles of the steel, leaving the raised portions with torn edges irregularly formed, which after hardening very soon wore off, and left the surface as smooth as before.

My invention consists in making upon the surface of a blank piece of steel of the proper shape as above; a series of continued longitudinal grooves, with sharp edges between them formed by compression from the substance of the metal, by a milling tool cut with sharp edges, as will be presently explained, thereby cutting away none of the metal, but increasing its density, and rendering it after being hardened, much more durable and serviceable than the old steel, in the use to which it is to be applied in the sharpening of knives. Instead of solid steel, wrought iron may in some instances be used for the blank, heretofore mentioned; by being case hardened, after the sharp edges have been impressed upon its surface.

My method for producing the sharp edges upon a steel as above referred to, will be better understood by a reference to the accompanying drawings.

In Figure I, C is a rest, moving upon the bed of an ordinary lathe, and actuated in its motion between the heads of the lathe by a screw, or other equivalent contrivance, and holding by means of a set screw D the mechanism by which the longitudinal grooving of the blank is effected.

A and B are two levers moving upon hinges at H and I, and pressed toward each other by the weighted cord or other like contrivance connecting their extremities as shown in the drawing; and holding between them at K the blank steel, which revolves by the motion of the lathe, being fixed between its two centers. In the upper part of the lower lever at K is a semicircular recess in which the steel revolves, and is thus kept steady, and immediately above in the upper lever is a rectangular orifice to admit the milling tool which is represented in Fig. 2. This tool is made of hardened steel, having serrations upon its periphery, which are formed with sharp edges as in the drawing, thereby differing from the ordinary milling instrument.

The operation of the machine is as follows: The blank steel revolving in the lathe is held in equilibris between the two levers A and B at the point K, and producing by friction a corresponding revolution of the milling tool; by the pressure caused by the weight at L, the surface of the blank is impressed with sharp edged serrations, which are continued throughout its whole length by means of the continued and regular motion of the slide rest, carrying with it the milling tool as before described, so as to produce a steel with the longitudinal sharp edges desired.

I do not claim the use of a milling tool, as such, nor do I claim the mandrel or opening for holding the steel; nor do I claim the use of the screw, or other contrivance, for forcing forward the impressing instrument, or its equivalent the movement of the steel itself, so as to produce the continued sharp edges in the direction of its length; but

What I claim as my invention, and desire to secure by Letters Patent, is—

The combination of these devices, so that by their continued action, they shall produce a steel with sharp ribs or edges in the direction of its length, substantially as set forth.

Taunton, March 23d, 1859.

SAMUEL LEE.

Witnesses:
JOHN S. BRAYTON,
WM. B. ALLYN.